(12) United States Patent
Suryawanshi et al.

(10) Patent No.: US 9,932,513 B2
(45) Date of Patent: Apr. 3, 2018

(54) TREATMENT FLUIDS COMPRISING STABILIZED HETEROPOLYSACCHARIDES AND RELATED METHODS

(71) Applicants: Prerana Umesh Suryawanshi, Pune (IN); Lalit Pandurang Salgaonkar, Pune (IN); Achala Vasudev Danait, Pune (IN)

(72) Inventors: Prerana Umesh Suryawanshi, Pune (IN); Lalit Pandurang Salgaonkar, Pune (IN); Achala Vasudev Danait, Pune (IN)

(73) Assignee: Haliburton Energy Services, Inc., Houston, TX (US)

( * ) Notice: Subject to any disclaimer, the term of this patent is extended or adjusted under 35 U.S.C. 154(b) by 355 days.

(21) Appl. No.: 13/748,266

(22) Filed: Jan. 23, 2013

(65) Prior Publication Data
US 2014/0202695 A1   Jul. 24, 2014

(51) Int. Cl.
*C09K 8/514* (2006.01)
*C09K 8/68* (2006.01)
*C09K 8/90* (2006.01)

(52) U.S. Cl.
CPC ............... *C09K 8/514* (2013.01); *C09K 8/68* (2013.01); *C09K 8/90* (2013.01); *C09K 2208/28* (2013.01)

(58) Field of Classification Search
CPC ........... C09K 8/536; C09K 8/805; C09K 8/94
USPC ............................................. 166/278
See application file for complete search history.

(56) References Cited

U.S. PATENT DOCUMENTS

| | | | |
|---|---|---|---|
| 4,670,501 A | 6/1987 | Dymond et al. |
| 5,249,627 A | 10/1993 | Harms et al. |
| 6,784,141 B1 | 8/2004 | King et al. |
| 7,004,254 B1 | 2/2006 | Chatterji et al. |
| 7,232,793 B1 | 6/2007 | King et al. |
| 7,271,134 B2 | 9/2007 | King et al. |
| 7,829,508 B2 | 11/2010 | Pauls et al. |
| 7,846,877 B1 | 12/2010 | Robb |
| 7,989,400 B2 | 8/2011 | Pauls et al. |
| 2005/0161220 A1 | 7/2005 | Todd et al. |

(Continued)

FOREIGN PATENT DOCUMENTS

WO   2014116418 A1   7/2014

OTHER PUBLICATIONS

International Search Report and Written Opinion for PCT/US2014/010620 dated May 9, 2014.

(Continued)

*Primary Examiner* — William D Hutton, Jr.
*Assistant Examiner* — Ashish K Varma
(74) *Attorney, Agent, or Firm* — McDermott Will & Emery LLP (57) ABSTRACT

Treatment fluids employing stabilized heteropolysaccharide-based gels in brines are used as part of gravel packing and combined gravel packing-fracturing operations; a method includes providing a treatment fluid which includes an aqueous brine base, a heteropolysaccharide including one selected from the group consisting of diutan, scleroglucan, and succinoglycan, and a protein present in an amount sufficient to stabilize the heteropolysaccharide and hence minimizing the salting out phenomenon, the method including placing the treatment fluid in a subterranean formation.

21 Claims, 2 Drawing Sheets

(56) References Cited

U.S. PATENT DOCUMENTS

| | | | |
|---|---|---|---|
| 2005/0261138 A1* | 11/2005 | Robb | C09K 8/68 |
| | | | 507/209 |
| 2005/0274517 A1 | 12/2005 | Blauch et al. | |
| 2005/0277554 A1 | 12/2005 | Blauch et al. | |
| 2006/0148658 A1 | 7/2006 | Hanes et al. | |
| 2008/0045422 A1 | 2/2008 | Hanes et al. | |
| 2008/0070807 A1* | 3/2008 | Munoz | C09K 8/514 |
| | | | 507/117 |
| 2011/0036583 A1* | 2/2011 | Willberg | E21B 43/26 |
| | | | 166/308.1 |
| 2012/0247774 A1 | 10/2012 | Li et al. | |

OTHER PUBLICATIONS

Gruijthuijsen et al., "Origin of Suppressed Demixing in Casein/Xanthan Mixtures," Soft Matter, 2012, 8, 1547-1555.

\* cited by examiner

I: Viscosity of Diutan at 270°F without Casein. Due to salting out effect viscosity drops
II: Viscosity of Diutan at 270°F in the presence of casein. Does not show salting out effect and hence maintains viscosity
III: Viscosity of Diutan at 270°F in the presence of Casein and breaker. Gel breaks in the presence of breaker Rheology of Diutan in the presence and absence of Casein

FIG. 1

A) Without Casein

Salting out effect (Lump formation) leads to drop in viscosity and hence faster settling of sand B) With Casein Addition of Casein 60 lb/Mgal arrests salting out effect, maintains viscosity and keeps sand suspended Sand Suspension Test: 60 lb/Mgal WG-38/ 11.5 ppg NaBr brine / 200°F / 6 gal/Mgal Formic acid (AR grade, MERCK)

FIG. 2

TREATMENT FLUIDS COMPRISING STABILIZED HETEROPOLYSACCHARIDES AND RELATED METHODS

BACKGROUND

The disclosure herein relates to treatment fluids employed in subterranean operations, and more particularly, to the stabilization of heteropolysaccharide-based gels in brine-based treatment fluids as part of subterranean operations, such as gravel packing and combined gravel packing-fracturing operations.

Gravel packing treatments have been used to reduce the migration of unconsolidated formation particulates into a well bore. During gravel packing operations, gravel particulates are generally carried to a well bore by a hydrocarbon or aqueous carrier fluid. The gravel particulates are suspended in a carrier fluid, which may be viscosified, and the carrier fluid is pumped into a well bore in which the gravel pack is to be placed. The carrier fluid may leak off into the subterranean zone and/or return to the surface while the particulates are left in the zone. The resultant gravel pack may act as a filter to separate formation sands from produced fluids while permitting the produced fluids to flow into the well bore. A portion of the gravel may be coated with tackifying agents, among other things, to further help control the migration of formation fines. Typically, gravel pack operations involve placing a gravel pack screen in the well bore and packing the surrounding annulus between the screen and the well bore with gravel designed to prevent the passage of formation sands through the pack. Such gravel packs may be used to stabilize the formation while causing minimal impairment to well productivity.

For gravel packing operations requiring higher densities, heteropolysaccharide-based viscosifiers, such as diutan gels are commonly employed in brine-based fluids. However, when diutan gels are prepared in high salt concentration brines (e.g., brine density greater than about 10 ppg such as, but not limited to, sodium bromide, calcium bromide, calcium chloride, cesium formate, cesium acetate, potassium formate and potassium acetate) and temperatures above about 180° F. (about 82° C.), diutan exhibits a salting-out effect at pH less than about 3. The salting-out effect is believed to be a cumulative effect of the following factors: temperature, brine density, concentration of diutan and pH. Hence, to maintain the requisite rheological properties of the treatment fluids, among the required considerations are a careful selection of salts and salt concentrations. In general, the salting-out effect trends along the Hofmeister series observed for proteins. Thus, bromides and iodides relative to chlorides are generally more favorable for preventing heteropolysaccharide salting-out. Iodides in particular, while providing good prevention of salting out, are not practical in typical gravel packing operations due to the prohibitive cost of iodide salts. Thus, the salting-out effect tends to limit the brine types, brine densities, and temperatures in which the treatment fluids can be prepared and used.

Other solutions to prevent or reduce salting-out include the use of urea, which has also not proved to be commercially viable. Other avenues employing, for example, xanthan-based gelling agents in lieu of diutan suffer from incompatibilities with crosslinkers used in xanthan-based systems as well as temperature limitations in operation.

SUMMARY OF THE INVENTION

The disclosure herein relates to treatment fluids employed in subterranean operations, and more particularly, to the stabilization of heteropolysaccharide-based gels in brine-based treatment fluids as part of subterranean operations such as gravel packing and combined gravel packing-fracturing operations.

In some embodiments, the disclosure herein provides a method comprising providing a treatment fluid comprising an aqueous brine base, a heteropolysaccharide comprising one selected from the group consisting of diutan, scleroglucan, and succinoglycan, and a protein present in an amount sufficient to stabilize the heteropolysaccharide, and the method comprising placing the treatment fluid in a subterranean formation.

In other embodiments, the disclosure herein provides a method comprising providing a gravel packing fluid comprising an aqueous brine base, gravel particulates, a heteropolysaccharide comprising one selected from the group consisting of diutan, scleroglucan, and succinoglycan, and a protein comprising one selected from the group consisting of casein or gluten, the protein present in an amount sufficient to stabilize the heteropolysaccharide, and the method comprising placing the gravel packing fluid in a subterranean formation.

In still other embodiments, the disclosure herein provides a method comprising providing a gravel packing fluid comprising an aqueous brine base, particulates, a heteropolysaccharide comprising one selected from the group consisting of diutan, scleroglucan, and succinoglycan, and a protein comprising one selected from the group consisting of casein or gluten, the protein present in an amount sufficient to stabilize the heteropolysaccharide; and placing the gravel packing fluid in a subterranean formation under sufficient pressure to promote fracturing.

The features and advantages of the disclosure herein will be readily apparent to those skilled in the art upon a reading of the description of the preferred embodiments that follows.

BRIEF DESCRIPTION OF THE DRAWINGS

The following figures are included to illustrate certain aspects of the disclosure herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The disclosure herein relates to treatment fluids employed in subterranean operations, and more particularly, to the stabilization of heteropolysaccharide-based gels in brine-based treatment fluids as part of subterranean operations such as gravel packing and combined gravel packing-fracturing operations.

Among the numerous advantages of the embodiments disclosed herein, the disclosure herein provides treatment fluids comprising heteropolysaccharide-based gels that are stabilized against salting out by including protein additives. The utility of heteropolysaccharide-based gel systems is thus extended at elevated temperatures and with useful operational pH and brine concentrations. In a particular exemplary embodiment, methods of the invention provide treatment fluids that include, for example, diutan-, scleroglucan-, or succinoglycan-based gel systems, which are desirably used in gravel packing operations or combined gravel packing-fracturing operations at relatively high brine concentrations, such as brine density greater than about 10 ppg having salts such as, but not limited to, sodium bromide, calcium bromide, calcium chloride, cesium formate, cesium acetate, potassium formate and potassium acetate, and high temperatures, such as greater than about 180° F. and gel loading higher than 40 lb/Mgal. Such methods may be performed even at relatively low pH, such as less than about 3.

In an exemplary embodiment, the stabilizing protein may be a casein phosphoprotein, as found in the major fraction of milk proteins. It is believed that the use of this protein is particularly advantageous both as a readily available inexpensive source as well as being relatively environmentally friendly and degradable. In some embodiments, the disclosure herein provides methods comprising providing treatment fluids comprising aqueous brine bases, heteropolysaccharides comprising one selected from the group consisting of diutan, scleroglucan, and succinoglycan, and a protein present in an amount sufficient to stabilize the heteropolysaccharide, and placing the treatment fluid in a subterranean formation. As used herein, an "amount of protein to stabilize the heteropolysaccharide" means an amount of protein that prevents or substantially reduces the salting-out of the heteropolysaccharide at high temperatures, such as greater than about 180° F. and high brine densities, such as greater than about 10 ppg NaBr that may include salts such as sodium bromide, calcium bromide, calcium chloride, cesium formate, cesium acetate, potassium formate and potassium acetate. As will be recognized by those skilled in the art, such stabilization also includes the contribution that pH plays in salting-out of the heteropolysaccharide gelling agents.

In some embodiments, heteropolysaccharides may comprise one selected from the group consisting of diutan, scleroglucan, and succinoglycan. In some embodiments the heteropolysaccharides may be used in combination with each other or other gelling agents. Diutan is a heteropolysaccharide comprising a carbohydrate as a major portion with about 12% protein and about 7% acyl groups disposed on the carbohydrate portion. The carbohydrate portion itself comprises about 19% glucuronic acid and the neutral sugars rhamnose and glucose in an approximate molar ratio of 3:2. Diutan, in particular, has excellent viscosity retention at high temperatures in comparison to typical polymer-based rheology modifiers, such as xanthan. The high viscosity and good thermal stability of diutan has led to its use as a preferred choice by those skilled in the art, especially in gravel packing fluid systems at high temperatures.

Scleroglucan is a neutral fungal polysaccharide and exhibits properties of a hydrophilic colloid, which has a tendency to thicken and stabilize water-based systems by conferring on them a relatively high viscosity, generally higher than that obtained in the case of xanthan, for example, at temperatures at or above about 200° F., for identical concentrations of active compounds. Scleroglucan also appears to be more resistant to pH and temperature changes than xanthan, and therefore, may impart more stable viscosities under such conditions. In certain aspects, the viscosity of a treatment fluid comprising scleroglucan may be insensitive to pH between a pH of about 1 and about 12.5 and up to a temperature limit of about 270° F. Generally, the main backbone polymer chain of scleroglucan comprises (1→3)β-D-glucopyranosyl units with a single β-D-glucopyranosyl group attached to every third unit on the backbone. Scleroglucan is thought to be resistant to degradation, even at high temperatures such as above about 200° F. in seawater.

Succinoglycan is a biopolymer capable of imparting useful rheological properties to sand slurries. Succinoglycan solutions display viscosities which are, below the succinoglycan's transition temperature, much more temperature insensitive than other polymers. Succinoglycan solutions are additionally more shear-thinning than polymers commonly used as viscosifiers. Succinoglycan is a heteropolysaccharide comprising glucose and, for each 7 moles of glucose, 0.9 to 1.2 moles of galactose and 0.65 to 1.1 moles of pyruvate, together with succinate and acetate in molar proportions (for each 7 moles of glucose) between 0 and 2. Heteropolysaccharides of this type may be generated by a variety of microorganisms, including those of the genera *Pseudomonas, Rhizobium, Alcaligenes* and *Agrobacterium*. Particularly suitable organisms include *Rhizobium meliloti, Alcaligenes faecalis* var. *myxogenes, Agrobacterium turnefaciens, Agrobacterium radiobacter, Agrobacterium rhizogenes*, and *Pseudomonas* sp. NCIB 11264, and also a strain of *Pseudomonas* species isolated from a sample of soil, and deposited at the National Collection of Industrial Bacteria, Torry Research Station, Aberdeen, under the accession number 11592.

With respect to diutan and succinoglycan, in particular, when employed in methods comprising gravel packing, these heterosaccharide-based gels can be completely broken down, such as by use of acidic breakers. This facility for breakdown aids the clean-up procedure. At lower operating temperatures, such as below 180° F., and lower brine densities, such as lower than about 10 ppg NaBr that may include salts such as sodium bromide, calcium bromide, calcium chloride, cesium formate, cesium acetate, potassium formate and potassium acetate, these heteropolysaccharides may maintain their conformational stability even under acidic pH, i.e., less than about 3, thus preventing the salting-out phenomenon.

The amount of heteropolysaccharide in the treatment fluid may be readily selected to provide good suspension of particulates such as sand/gravel, in a manner dependent on the exact operating bottom hole conditions. In some embodiments, the heteropolysaccharide may be present in an amount from a lower end from about 0.24% (20 lb/Mgal) to about 4.8% (40 lb/Mgal) by weight of the treatment fluid, to an upper end from about 4.8% (40 lb/Mgal) to about 0.96% (80 lb/Mgal) by weight of the treatment fluid.

In some embodiments, the protein comprises a casein or gluten. Casein is a phosphoprotein found in milk and forms the major fraction of milk proteins. Casein contains a fairly high number of proline residues, which do not interact and generally contains no disulfide bridges. As a result, it has relatively little tertiary structure. Casein is relatively hydrophobic, making it poorly soluble in water and is found in milk as a suspension of particles called "casein micelles" which show only limited resemblance with surfactant-type micellae. Indeed, the hydrophilic portions of casein micelles reside at the surface and are spherical. However, in sharp contrast to surfactant micelles, the interior of a casein micelle is highly hydrated. The caseins in the micelles are typically held together by calcium ions and hydrophobic interactions. Gluten bears some structural resemblance to casein and typically consists mainly of gliadin (prolamin) and glutenin (glutelin) which are the main constituents of cereal proteins. Without being bound by theory, embodiments of the invention include the addition of casein, gluten, and related proteins to the treatment fluid to provide a stabilizing effect on the heteropolysaccharides present, preventing them from salting-out. In some embodiments, a ratio of heteropolysaccharide to such proteins may be in a range from about 1:0.25 to about 1:1.5, including about 1:0.25, 1:0.50, 1:0.75, 1:1.0, 1:1.25, and 1:1.5, and any ratio in between. In particular embodiments, the ratio of heteropolysaccharide to casein or gluten may be about 1:1.

Aqueous base fluids suitable for use in the treatment fluids of the disclosure herein may comprise fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the first treatment fluids or second treatment fluids of the disclosure herein. In certain embodiments, the density of the aqueous base fluid can be adjusted, among other purposes, to provide additional particulate transport and suspension in the treatment fluids used in the methods of the disclosure herein. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate. In some embodiments, the pH range may preferably be from about 1 to about 5.

In particular embodiments, the aqueous base fluid comprises a brine. Brines may be based on, for example, salts such as, sodium bromide, calcium chloride, calcium bromide, zinc bromide, potassium carbonate, sodium formate, potassium formate, cesium formate, cesium acetate, sodium acetate, potassium acetate, calcium acetate, ammonium acetate, ammonium chloride, ammonium bromide, sodium nitrate, potassium nitrate, ammonium nitrate, ammonium sulfate, calcium nitrate, and sodium carbonate, or any combination thereof. In some embodiments, the aqueous brine fluid may have a density in a range from about 8.4 to about 19.2 ppg. In some embodiments, the aqueous brine fluid may have a density in the range of up to about 12 ppg. Under such concentrations, treatment fluids of the invention may be stable against salting-out of the heteropolysaccharides due, at least in part, to the presence of the stabilizing protein, such as casein or gluten.

In some embodiments, the treatment fluids for use in conjunction with the disclosure herein may be foamed. As used herein the term "foam" refers to a two-phase composition having a continuous liquid phase and a discontinuous gas phase. In some embodiments, treatment fluids for use in conjunction with the disclosure herein may comprise an aqueous base fluid, a gas, and a foaming agent.

Suitable gases for use in conjunction with the disclosure herein may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 lb of proppant per gal of fracture fluid.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the disclosure herein may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

In some embodiments, the treatment fluid comprises a pH in a range from about 1 to about 5. In some embodiments, the treatment fluid comprises a pH in a range from about 2 to about 4. In methods of the invention, the heteropolysaccharide-based gel may also be broken down at lower pH, for example, below about 1. Again, methods of the invention benefit from a greater range of pH tolerance while avoiding the salting-out effect.

In some embodiments, the treatment fluids of the disclosure herein may comprise a plurality of proppant particulates. Particulates suitable for use in the disclosure herein may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the disclosure herein. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the disclosure herein. In certain embodiments, the particulates may be present in the first treatment fluids of the disclosure herein in an amount in the range of from about 0.5 pounds per gallon ("ppg") to about 30 ppg by volume of the treatment fluid.

In some embodiments, methods of the invention comprise working at operating temperature in a range from about 37° C. (98.6° F.) to about 135° C. (285° F.). In some embodiments, methods of the invention comprise working at operating temperature up to about 132° C. (270° F.). This temperature range represents a useful expansion of operating temperature compared to, for example, xanthan-based gel systems.

In some embodiments, the treatment fluid comprises a gravel packing fluid. In some such embodiments, the treatment fluid may comprise a gravel packing fluid which is also used for fracturing. Thus, in some embodiments, the disclosure herein provides methods comprising steps including providing gravel packing fluid comprising an aqueous brine base, gravel particulates, a heteropolysaccharide comprising one selected from the group consisting of diutan, scleroglucan, and succinoglycan, and a protein comprising one selected from the group consisting of casein or gluten, the protein present in an amount sufficient to stabilize the heteropolysaccharide, and the method comprising placing the gravel packing fluid in a subterranean formation.

Suitable brine solutions for gravel packing operations may comprise one selected from the group consisting of a sodium bromide brine, a calcium bromide brine, sodium chloride-sodium bromide, potassium chloride-potassium bromide, potassium chloride-sodium bromide, calcium chloride-calcium bromide, calcium bromide-zinc bromide and cesium formate, cesium acetate, potassium formate or any combination thereof.

In some embodiments, methods employing the gravel packing fluids may comprises a pH in a range from about 1 to about 5, while other embodiments, the gravel packing fluid may comprise a pH in a range from about 2 to about 4.

Gravel packing methods may further comprise providing a sand screen. Generally, gravel packing includes sand-control methods used to prevent production of formation sand. In gravel packing operations, a steel screen is typically placed in the wellbore and the surrounding annulus is packed with prepared gravel of a specific size designed to prevent the passage of formation sand. Gravel packing may serve to stabilize the formation while causing minimal impairment to well productivity. Methods of the invention may be used to treat damaged gravel pack completion jobs, washed out zones, and newly perforated zones. In some embodiments, the gravel packing and fracturing operations may be combined in a single operation.

In some embodiments, the gravel packing fluid may further comprise one selected from the group consisting of biocide, chelating agent, non-emulsifier, breaker, resin/crosslinkers, relative permeability modifiers, friction reducers and tackifiers.

The treatment fluids useful in the methods of the disclosure herein may include internal gel breakers such as enzyme, oxidizers, acid buffer, or delayed gel breakers. The gel breakers may cause the treatment fluids of the disclosure herein to revert to thin fluids that can be produced back to the surface, for example, after they have been used to place proppant particles in subterranean fractures. In some embodiments, the gel breaker may be formulated to remain inactive until it is "activated" by, among other things, certain conditions in the fluid (e.g., pH, temperature, etc.) and/or interaction with some other substance. In some embodiments, the gel breaker may be delayed by encapsulation with a coating (e.g., a porous coating through which the breaker may diffuse slowly, or a degradable coating that degrades downhole) that delays the release of the gel breaker. In other embodiments the gel breaker may be a degradable material (e.g., polylactic acid or polygylcolic acid) that releases an acid or alcohol in the presence of an aqueous liquid. In certain embodiments, the gel breaker used may be present in the first treatment fluid and/or second treatment fluid in an amount in the range of from about 1% to about 250% by weight of the gelling agent. One of ordinary skill in the art, with the benefit of this disclosure, will recognize the type and amount of a gel breaker to include in certain treatment fluids of the disclosure herein based on, among other factors, the desired amount of delay time before the gel breaks, the type of gelling agents used, the temperature conditions of a particular application, the desired rate and degree of viscosity reduction, and/or the pH of the first treatment fluid and/or second treatment fluid.

In certain embodiments, the treatment fluids of the disclosure herein may comprise a friction reducing polymer. Friction reducing polymers suitable for use in the treatment fluids useful in the methods of the disclosure herein should, among other things, reduce energy losses due to friction in the aqueous treatment fluids of the disclosure herein. For example, friction reducing polymers suitable for use in the disclosure herein may reduce energy losses during introduction of the first treatment fluid into a well bore due to friction between the aqueous treatment fluid in turbulent flow and the formation and/or tubular good(s) (e.g., a pipe, coiled tubing, etc.) disposed in the well bore. Any friction reducing polymer suitable for use in subterranean operations may be suitable for use in the treatment fluids useful in the methods of the disclosure herein. Additionally, friction reducing polymers suitable for use in the disclosure herein may be polymers and/or copolymers. The term "copolymer," as used herein, is not limited to polymers comprising two types of monomeric units, but includes any combination of monomeric units, e.g., terpolymers, tetrapolymers, and the like. An example of a suitable friction reducing polymer comprises a quaternized aminoalkyl acrylate, such as a copolymer of acrylamide and dimethylaminoethyl acrylate quaternized with benzyl chloride. Another example of a suitable friction reducing polymer comprises acrylamide. An example of a suitable friction reducing polymer comprising acrylamide is a copolymer of acrylamide and acrylic acid. Such friction reducing polymers may further comprise additional monomers, such as 2-acrylamido-2-methylpropanesulfonic acid, N,N-dimethyl acrylamide, vinylsulfonic acid, N-vinyl acetamide, N-vinyl formamide, and mixtures thereof. Other examples of suitable friction reducing polymers are described in U.S. Pat. Nos. 6,784,141, 7,004,254, 7,232,793, and 7,271,134 and U.S. Patent Application Publication No. 2008/0045422, the entire disclosures of which are incorporated herein by reference. Combinations and derivatives of suitable friction reducing polymers may also be suitable for use.

The friction reducing polymers should have a molecular weight sufficient to provide a desired level of friction reduction. Generally, friction reducing polymers having higher molecular weights may be needed to provide a desirable level of friction reduction. For example, in some embodiments, the average molecular weight of the friction reducing polymers may be in the range of from about 7,500,000 to about 20,000,000, as determined using intrinsic viscosities. Those of ordinary skill in the art will recognize that friction reducing polymers having molecular weights outside the listed range may still provide some degree of friction reduction in an aqueous treatment fluid.

The friction reducing polymers may be included in the treatment fluids of the disclosure herein in an amount sufficient to provide the desired reduction of friction without forming a gel. Formation of a gel is dependent on a number of factors including the particular friction reducing polymer used, concentration of the friction reducing polymer, temperature, and a variety of other factors known to those of ordinary skill in the art. While the addition of friction reducing polymers may minimally increase the viscosity of the first treatment fluids, the polymers are generally not included in the aqueous treatment fluids of the disclosure herein in an amount sufficient to substantially increase the viscosity. In some embodiments, the friction reducing polymer may be present in an amount in the range of from about 0.01% to about 0.5% by weight of the first treatment fluid. In some embodiments, the friction reducing polymer may be present in an amount in the range of from about 0.025% to about 0.25% by weight of the first treatment fluid.

The friction reducing polymers may be provided in any suitable form, including in a solid form, as an oil-external emulsion polymer, or as a component of an aqueous solution. In embodiments where a particular friction reducing polymer is provided as an oil-external emulsion polymer, the oil-external emulsion polymer may comprise water, a water-immiscible liquid, an emulsifying surfactant, and a friction reducing polymer. Suitable oil-external emulsion polymers further may comprise inhibitors, salts, and inverters. As those of ordinary skill in the art will appreciate, with the benefit of this disclosure, upon addition to the aqueous treatment fluid, the emulsion should invert, releasing the friction reducing polymer into the aqueous treatment fluid.

Aqueous tackifying agents suitable for use in the disclosure herein are usually not generally significantly tacky when placed onto a particulate, but are capable of being "activated" (e.g., destabilized, coalesced and/or reacted) to transform the compound into a sticky, tackifying compound at a desirable time. Such activation may occur before, during, or after the aqueous tackifier agent is placed in the subterranean formation. In some embodiments, a pretreatment may be first contacted with the surface of a particulate to prepare it to be coated with an aqueous tackifier agent. Suitable aqueous tackifying agents are generally charged polymers that comprise compounds that, when in an aqueous solvent or solution, will form a nonhardening coating (by itself or with an activator) and, when placed on a particulate, will increase the continuous critical resuspension velocity of the particulate when contacted by a stream of water. The aqueous tackifier agent may enhance the grain-to-grain contact between the individual particulates within the formation (be they proppant particulates, formation fines, or other particulates), helping bring about the consolidation of the particulates into a cohesive, flexible, and permeable mass.

Suitable aqueous tackifying agents include any polymer that can bind, coagulate, or flocculate a particulate. Also, polymers that function as pressure-sensitive adhesives may be suitable. Examples of aqueous tackifying agents suitable for use in the disclosure herein include, but are not limited to, acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers; derivatives thereof, and combinations thereof. Methods of determining suitable aqueous tackifying agents and additional disclosure on aqueous tackifying agents can be found in U.S. Patent Publication No. 2005/0277554, filed Jun. 9, 2004 and U.S. patent application Ser. No. 2005/0274517, filed Jun. 9, 2004, the entire disclosures of which are hereby incorporated by reference.

Some suitable tackifying agents are described in U.S. Pat. No. 5,249,627 by Harms, et al., the entire disclosure of which is incorporated by reference, which discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% C1-30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl (meth)acrylates and their quaternary addition and acid salts, acrylamide, N-(dialkyl amino alkyl)acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique. Methods of producing these copolymers are disclosed, for example, in U.S. Pat. No. 4,670,501, the entire disclosure of which is incorporated herein by reference.

In some embodiments, methods of the disclosure herein comprise providing a gravel packing fluid comprising an aqueous brine base, particulates, a heteropolysaccharide selected from a diutan, a scleroglycan, and a succinoglycan, and a protein comprising one selected from the group consisting of casein or gluten, the protein present in an amount sufficient to stabilize the heteropolysaccharide and the method comprising placing the gravel packing fluid in a subterranean formation under sufficient pressure to promote fracturing.

Such operations comprise a combined gravel packing procedure and fracturing of the formation. In such operations, the treatment fluids described herein are pumped into the formation above fracturing pressure. Screens are in place during pumping. In general, the sand control gravel is placed outside the casing/screen annulus. In some embodiments, the combination of fracturing and gravel packing may improve well production. Fracturing while gravel packing may help by bypassing formation damage or skin effects, and creating an external pack around the well bore.

To facilitate a better understanding of the disclosure herein, the following examples of preferred or representative embodiments are given. In no way should the following examples be read to limit, or to define, the scope of the invention.

Examples

This Example shows the results of stability studies of an exemplary treatment fluid in accordance with embodiments disclosed herein.

Diutan gel (available from Halliburton Energy Services, Inc. Duncan, Okla.) was hydrated as per the procedure given below.

Gel Mixing Procedure: The required amount of biocide, bactericide, iron chelating agent and gelling agent were mixed in 1 lit. of brine. All required additives were mixed under constant stirring. After thorough mixing, the gel was allowed to stand for 1 hr. to ensure complete hydration. Once the complete hydration took place, casein in the indicated concentrations was added followed by the addition of non-emulsifier.

Gel stability studies of Diutan gels were performed at two different gel loadings and different brine densities with varying concentrations of casein. The effect of casein on gel stability in the presence of formic acid, (AR grade, purity 97%, commercially available from MERCK) breaker was studied at about 200° F. The results are summarized in Table 1 below.

TABLE 1

| TEMPERATURE | 200° F. | | |
|---|---|---|---|
| NaBr Density | 10.5 ppg | 11.5 ppg | 12 ppg |
| Gel Loading | 50 lb/Mgal | 60 lb/Mgal | 60 lb/Mgal |
| Casein concentration | 0.6 g/100 mL | 0.72 g/100 mL | 0.72 g/100 mL |
| Formic acid (AR grade, Purity 97%, MERCK) | 6 gal/Mgal | 6 gal/Mgal | 6 gal/Mgal |
| pH | <3 | <3 | <3 |
| Gel stability without casein | Small lumps | Small lumps | Lump formation |
| Gel stability with casein | No phase separation | No phase separation | No phase separation |

Figure 1:
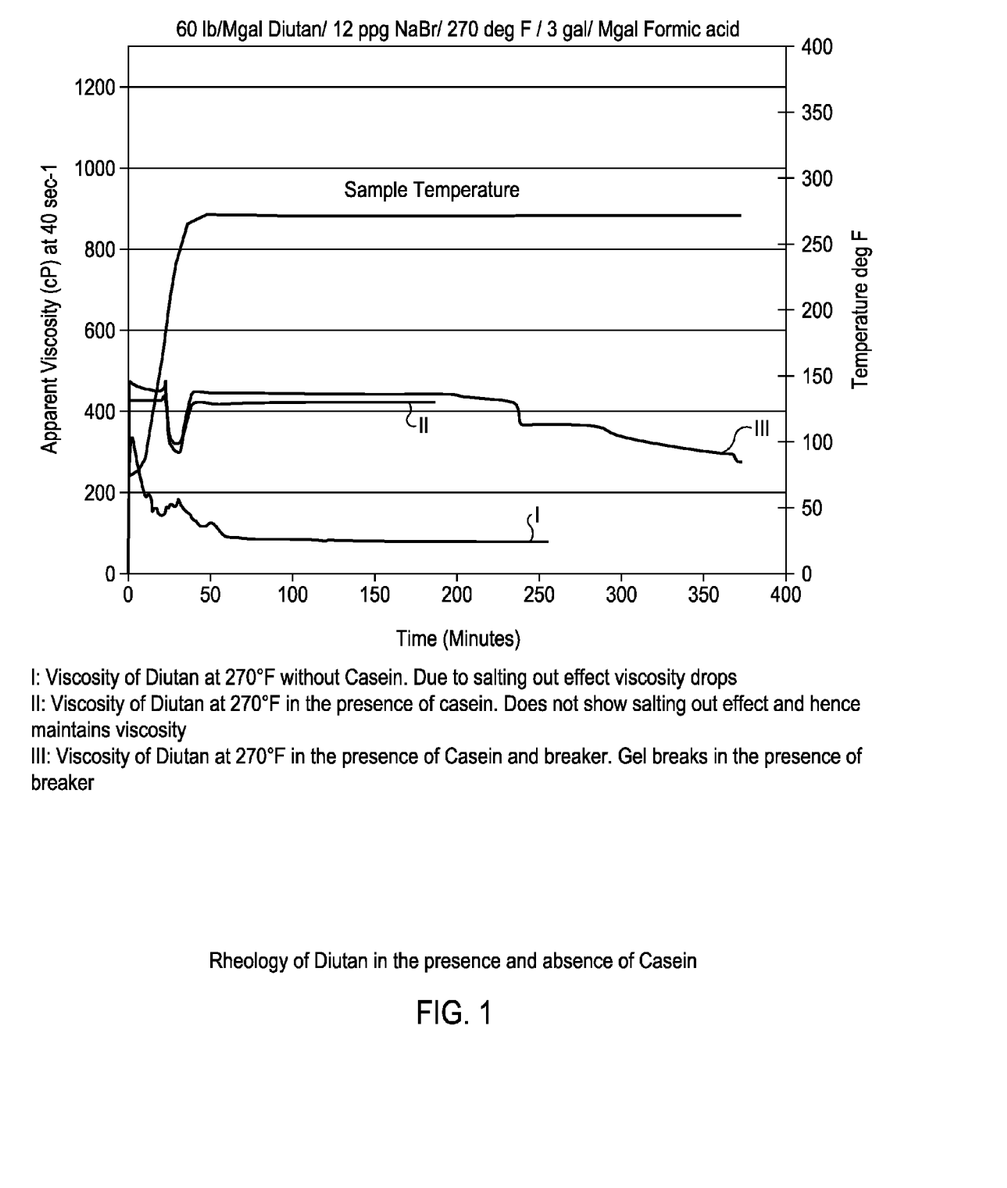
FIG. 1 is a graph plotting viscosity as a function of time in the presence of a diutan gel in sodium bromide brine and in the presence of a formic acid (AR grade, Purity 97% commercially available from Merck, Inc.) breaker.

The rheology of diutan in the presence of casein is shown in FIG. 1. Each of the three fluids in FIG. 1 includes 60 lb/gal diutan, 12 ppg NaBr, and 3 gal/Mgal formic acid. The line labeled as II in FIG. 1 additionally includes 60 lb/Mgal casein. The line labeled as III additionally includes 60 lb/Mgal casein and a breaker 3 gal/Mgal of a formic acid breaker. The three fluids were tested at 270° F. to find their apparent viscosity (cP at 40 sec-1) over time. As can be seen in FIG. 1, the mixture without casein (line I) shows viscosity drops due to salting out. The mixture including casein (line II) maintains viscosity without salting out. The mixture having casein and a breaker (line III) shows stable viscosity followed by a drop when the breaker begins to have an effect in breaking the gel. Thus, in the absence of casein additive, phase separation was observed, which led to lump formation. It is believed that this phenomenon occurs due to the cloud point effect. The tendency of colloid/polymer mixtures to phase separate is believed to be due to the steric exclusion of the polymer from an area around the colloid. This results in an effective attraction between the colloids, which, in turn, leads to phase separation.

However, as observed, in the presence of casein, diutan-casein mixtures are formed, which is believed to deplete the effect of phase separation at high temperatures, even in the presence of high salt concentrations. It is believed that this may be attributed to arresting of a gel in a colloid rich phase.

Table 1 indicates that with the addition of casein, phase separation effects of diutan at 200° F. can be arrested in brine densities varying from 10.5 ppg to 12 ppg NaBr at gel loading of 50 lb/Mgal and 60 lb/Mgal.

Because suspension properties are important in gravel packing jobs, sand suspension tests were also conducted. Tests were performed at 200° F. to enable observation of the sand suspension behavior.

Sand Settling Tests. The test temperature was about 200° F.: The proppant and the required test fluid were placed together in a bottle which was placed in a preheated water bath and maintained at the test temperature of 200° F. When the temperature of the test fluid/proppant slurry reached the test temperature, the slurry was mixed using an overhead mixer until uniform. Breaker was then added to test fluid proppant slurry. After mixing the breaker, sand settling was measured after 1 hr. The amount of clear fluid separated at the top of the test mixture was observed. The sand suspension test conditions are indicated below in Table 2.

TABLE 2

| | TEST 1 |
|---|---|
| Gelling agent | Diutan |
| Temperature | 200° F. |
| Brine | 12.0 ppg NaBr |
| Breaker | 6 gal/Mgal Formic acid (AR grade, MERCK) |
| Proppant type | Carbolite 20/40 |
| Proppant loading | 6.0 ppg |
| Test duration | 1 hr (water bath) |

In the absence of casein, the sand settling rate was observed to be faster, and 14 ml clear fluid was separated at the top of the test mixture. While in the presence of casein, the sand remained suspended for 1 hr. and there was only 1 ml of clear fluid at the top of the test mixture.

Figure 2:
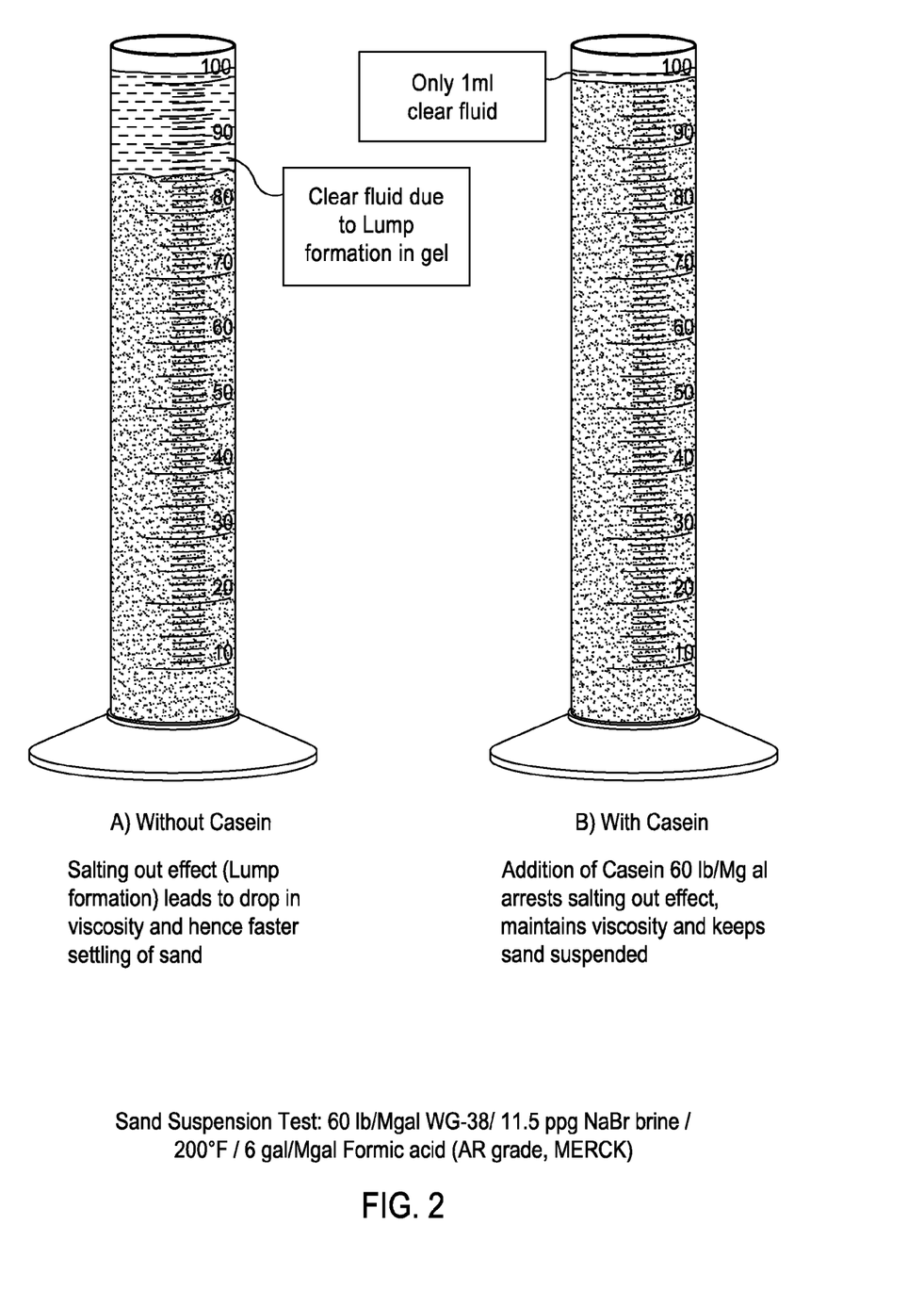
FIG. 2 shows sand suspension test A) in the absence of casein and B) in the presence of casein.

To observe the effect of the casein additive on the viscosity and stability at high temperatures and high brine densities, rheology tests were conducted with 60 lb/Mgal diutan in 12 ppg NaBr brine at 270° F., with and without casein. A Chandler 5550 Viscometer was equipped with a B5 bob and R1 rotor. A sample of 52 ml was loaded into the sample cup. The fluid was sheared at a constant shear rate of 40 sec$^{-1}$. For break tests, formic acid (AR grade, Purity 97%, MERCK) was added to the base gel and mixed it properly in a Waring blender jar. FIG. 2 illustrates the results.

Compared to the test with casein, the test with additive indicated a stable viscosity up to about three hours, as indicated in FIG. 2. FIG. 2 shows that without casein there was a salting out effect that lead to a drop in viscosity, which caused the same to settle out, as was displayed by clear approximately 14 mL of fluid forming at the top of the test beaker on the left. The test beaker on the right, having 60 lb/gal of casein showed only 1 mL of clear fluid, indication of better viscosity maintenance and less settling. The test with casein was repeated (test II) and continued for six hours. The results indicated that casein appears to impart stability to the fluid at 270° F. as well as at high brine density.

Therefore, the disclosure herein is well adapted to attain the ends and advantages mentioned as well as those that are inherent therein. The particular embodiments disclosed above are illustrative only, as the disclosure herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure herein. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid comprising:
      an aqueous brine base;
      a heteropolysaccharide comprising one selected from the group consisting of diutan, scleroglucan, and succinoglycan; and
      a protein comprising one selected from the group consisting of casein micelles and gluten micelles having a hydrated interior, the protein present in an amount sufficient to stabilize the heteropolysaccharide, wherein the treatment fluid has a pH of about 1 to about 5; and
   placing the treatment fluid in a subterranean formation,
      wherein a ratio of heteropolysaccharide to protein is about 1:0.25 to about 1:1.5.

2. The method of claim 1, wherein the treatment fluid has a pH of about 2 to about 4.

3. The method of claim 1, wherein the treatment fluid further comprises a proppant.

4. The method of claim 1, wherein the method comprises an operating temperature in a range from about 37° C. to about 135° C.

5. The method of claim 1, wherein the aqueous brine fluid has a density in a range from about 8.4 to about 15 ppg.

6. The method of claim 1, wherein the brine solution comprises one selected from the group consisting of a sodium bromide brine, a calcium bromide brine, sodium chloride-sodium bromide, potassium chloride-potassium bromide, potassium chloride-sodium bromide, calcium chloride-calcium bromide, calcium bromide-zinc bromide, potassium formate, potassium acetate, cesium acetate and cesium formate.

7. The method of claim 1, wherein the treatment fluid comprises a gravel packing fluid.

8. The method of claim 1, wherein the treatment fluid is a gravel packing fluid which is also used for fracturing.

9. A method comprising:
   providing a gravel packing fluid comprising:
      an aqueous brine base;
      gravel particulates;
      a heteropolysaccharide comprising one selected from the group consisting of diutan, scleroglucan, and succinoglycan; and
      a protein comprising one selected from the group consisting of casein micelles and gluten micelles having a hydrated interior, the protein present in amount sufficient to stabilize the heteropolysaccharide, wherein the gravel packing fluid has a pH of about 1 to about 5; and
   placing the gravel packing fluid in a subterranean formation,
      wherein a ratio of the heteropolysaccharide to the protein is about 1:0.25 to about 1:1.5.

10. The method of claim 9, wherein the brine solution comprises one selected from the group consisting of a sodium bromide brine, a calcium bromide brine, sodium chloride-sodium bromide, potassium chloride-potassium bromide, potassium chloride-sodium bromide, calcium chloride-calcium bromide, calcium bromide-zinc bromide, potassium acetate, potassium formate, cesium acetate and cesium formate.

11. The method of claim 9, wherein the gravel packing fluid has a pH of about 2 to about 4.

12. The method of claim 9, wherein the method comprises an operating temperature in a range from about 37° C. to about 135° C.

13. The method of claim 9, wherein the treatment fluid comprises a brine density in a range from 8.4 to about 15 ppg.

14. The method of claim 9, further comprising providing a sand screen.

15. The method of claim 9, wherein the gravel packing fluid further comprises one selected from the group consisting of biocide, chelating agent, non-emulsifier, breaker, resin/crosslinkers, relative permeability modifiers, friction reducers and tackifiers.

16. A method comprising:
   providing a gravel packing fluid comprising:
      an aqueous brine base;
      particulates;
      a heteropolysaccharide comprising one selected from the group consisting of diutan, scleroglucan, and succinoglycan and at a concentration of about 20 lb/Mgal to about 80 lb/Mgal; and
      a protein comprising one selected from the group consisting of casein micelles and gluten micelles having a hydrated interior, the protein present in an amount sufficient to stabilize the heteropolysaccharide, wherein the gravel packing fluid has a pH of about 1 to about 5, and wherein a ratio of the heteropolysaccharide to the protein is about 1:0.25 to about 1:1.5; and
   placing the gravel packing fluid in a subterranean formation under sufficient pressure to promote fracturing.

17. The method of claim 16, wherein the brine solution comprises one selected from the group consisting of a sodium bromide brine, a calcium bromide brine, sodium chloride-sodium bromide, potassium chloride-potassium bromide, potassium chloride-sodium bromide, calcium chloride-calcium bromide, calcium bromide-zinc bromide, potassium acetate, potassium formate, cesium acetate and cesium formate.

18. The method of claim 16, wherein the gravel packing fluid has a pH of about 1.5 to about 4.

19. The method of claim 16, wherein the method comprises an operating temperature in a range from about 37° C. to about 135° C.

20. The method of claim 16, wherein the treatment fluid comprises a brine density in a range from about 8.4 to about 15 ppg.

21. The method of claim 16, wherein the gravel packing fluid further comprises one selected from the group consisting of biocide, chelating agent, non-emulsifier, breaker, resins/crosslinkers, relative permeability modifiers, friction reducers and tackifiers.

* * * * *